C. Polley,
Burrow Trap,
N° 78,128. Patented May 19, 1868.

Witnesses.
H. C. Ashkettle
Wm A. Morgan

Inventor
Clark Polley
per Munn & Co
Attorneys.

United States Patent Office.

CLARK POLLEY, OF SINKING SPRING, OHIO.

Letters Patent No. 78,128, dated May 19, 1868.

---

IMPROVED MOLE-TRAP.

---

*The Schedule referred to in these Letters Patent and making part of the same.*

---

TO ALL WHOM IT MAY CONCERN:

Be it known that I, CLARK POLLEY, of Sinking Spring, in the county of Highland, and State of Ohio, have invented a new and useful Improvement in Mole-Traps; and I do hereby declare that the following is a full, clear, and exact description thereof, which will enable others skilled in the art to make and use the same, reference being had to the accompanying drawings, forming part of this specification, in which—

Similar letters of reference indicate like parts.

The object of this invention is to furnish a trap for the destruction of moles, and its construction and operation will be duly set forth in the following.

The ravages of the burrowing animal, commonly called the mole, is well known, and notwithstanding many ingenious devices have been invented for the purpose of mitigating their destructive effects, nothing which was simple, cheap, and thoroughly efficient was produced until the invention set forth in the following was devised.

Figure 1:
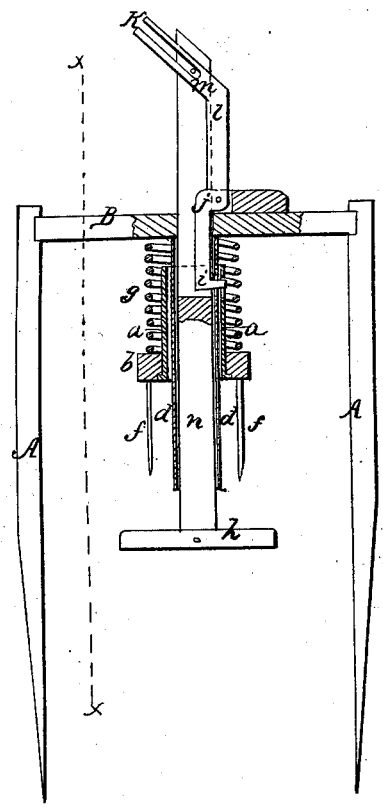
Figure 1 is a side view of my improved mole-trap, with the working part shown in section.
Figure 2:
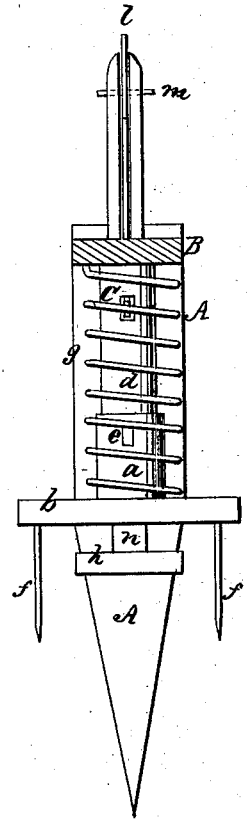
Figure 2 is a sectional view of the trap, the section being taken through the line $x\ x$, fig. 1.

In fig. 1 my trap is represented set for action, and in fig. 2 the same is shown sprung.

The pointed stakes A, united by the cross-piece B, support the working parts, which latter consist of, first, a trigger-staff, $n$, sliding freely within the tube $a$, to which latter is affixed the cross-head $b$, bearing the points $ff$ at each end. The tube $a$ slides with easy contact upon an inner tube, $d$, the upper end of which is affixed to the cross-piece B. The trigger-staff passes through both tubes and the cross-piece B, and projects above the latter, as shown.

The upper end of the said staff is slitted centrally with a cut, in which latter is pivoted the catch-lever $l$, the upper end of which is bent at an angle of forty-five degrees, more or less, and is slotted, as shown at $k$, to work upon a pin, $m$, passing through the said saw-cut. The lever is pivoted to the cross-piece B at $j$, and its lower end terminates in a horizontal projection, $i$, which projects through a hole in the tube $d$, and also through a similar hole in the tube $a$, when the latter tube is brought down against the tension of the coil-spring $g$, so that its hole, $e$, will coincide with the hole $c$ of the tube $d$, and thereby admit the projection $i$ of the catch-lever, as shown at fig. 1.

The trap is then set. When the trigger-staff is pressed upward, the pin $m$, in the slot $k$, will actuate the lever, to withdraw the projection $i$ from the hole $e$, when the tube $a$, bearing the metal points $ff$, will be sprung downward with force, and will thus impale the animal underneath, for the pointed stakes A A are pushed into the ground across the path of the mole until the crutch-end $h$ of the trigger-staff is in close proximity to the surface, and crosswise of the mole's path, so that the animal, in effecting a passage underneath the crutch-head, will actuate the trigger-staff upward, which will cause the lever to spring the trap. There are several of the points $f$ at each end of the crutch-head, so that the mole will be transfixed when coming from either direction.

Several of these traps may be set out across the path of moles, which are readily discerned by the puffed ridge of earth, and as moles retrace their course several times, the trap will be certain to impale them.

Thus a few traps will protect an ordinary-sized garden in the spring, when the newly-planted seeds are often entirely eaten up by moles.

Having thus described my invention, I claim as new, and desire to secure by Letters Patent—

The combination of one or more pointed stakes A with a cross-piece, B, the tubes $e$ and $d$, the spring $g$, trigger-staff $n$, lever $l$, crutch-head $b$, having points $ff$, all constructed and operating together substantially as shown and described, and for the purpose set forth.

CLARK POLLEY.

Witnesses:
EDWIN McKEEHAN,
JESSE M. WOLTZ.